(12) United States Patent
Li et al.

(10) Patent No.: US 10,310,316 B2
(45) Date of Patent: Jun. 4, 2019

(54) LIQUID CRYSTAL DISPLAY PANEL AND MOBILE TERMINAL

(71) Applicant: Xiaomi Inc., Beijing (CN)

(72) Inventors: Guosheng Li, Beijing (CN); Anyu Liu, Beijing (CN); Kun Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 232 days.

(21) Appl. No.: 15/210,605

(22) Filed: Jul. 14, 2016

(65) Prior Publication Data

US 2017/0045770 A1 Feb. 16, 2017

(30) Foreign Application Priority Data

Aug. 12, 2015 (CN) .......................... 2015 1 0493676

(51) Int. Cl.
*G02F 1/1333* (2006.01)
*G06F 3/041* (2006.01)
(Continued)

(52) U.S. Cl.
CPC ...... *G02F 1/13338* (2013.01); *G02F 1/13439* (2013.01); *G02F 1/133514* (2013.01);
(Continued)

(58) Field of Classification Search
CPC ........... G02F 1/13338; G02F 1/133514; G02F 1/13439; G02F 1/133528; G02F 1/134336;
(Continued)

(56) References Cited

U.S. PATENT DOCUMENTS 6,002,389 A 12/1999 Kasser
9,354,731 B1 5/2016 Pance et al.
(Continued)

FOREIGN PATENT DOCUMENTS

CN 101174047 A 5/2008
CN 101251666 A 8/2008
(Continued)

OTHER PUBLICATIONS

Combined Office Action and Search Report dated Jul. 4, 2017 in Chinese Patent Application No. 201510493676.3 (with English translation of categories of cited documents).
(Continued)

*Primary Examiner* — Andrew Sasinowski
(74) *Attorney, Agent, or Firm* — Oblon, McClelland, Maier & Neustadt, L.L.P.

(57) ABSTRACT

Aspects of the disclosure provide a liquid crystal display panel that includes a glass substrate, a color filter, and a liquid crystal layer between the glass substrate and the color filter. The liquid crystal layer includes an array of supporting members at a first side of the liquid crystal layer, one or more transparent electrodes at a second side of the liquid crystal layer, and liquid crystals between the array of supporting members and the one or more transparent electrodes. The first side of the liquid crystal layer is adjacent to one of the glass substrate and the color filter. The second side of the liquid crystal layer is adjacent to the other one of the glass substrate and the color filter.

14 Claims, 5 Drawing Sheets

(51) Int. Cl.
*G06F 3/044* (2006.01)
*G02F 1/1335* (2006.01)
*G02F 1/1343* (2006.01)
*G02F 1/1362* (2006.01)

(52) U.S. Cl.
CPC .. *G02F 1/133528* (2013.01); *G02F 1/134309* (2013.01); *G02F 1/134336* (2013.01); *G06F 3/044* (2013.01); *G06F 3/0412* (2013.01); *G06F 3/0414* (2013.01); *G02F 1/1362* (2013.01); *G02F 2001/133302* (2013.01); *G06F 2203/04103* (2013.01); *G06F 2203/04106* (2013.01)

(58) Field of Classification Search
CPC ... G02F 1/134309; G02F 2001/133302; G02F 1/1362; G06F 3/0412; G06F 3/044; G06F 3/0414; G06F 2203/04103; G06F 2203/04106
See application file for complete search history.

(56) References Cited

U.S. PATENT DOCUMENTS

| | | | |
|---|---|---|---|
| 2004/0150629 A1* | 8/2004 | Lee | G06F 5/00 345/173 |
| 2014/0247239 A1 | 9/2014 | Jamshidi-Roudbari et al. | |
| 2014/0368467 A1* | 12/2014 | Park et al. | G06F 3/044 345/174 |

FOREIGN PATENT DOCUMENTS

| | | |
|---|---|---|
| CN | 101430464 A | 5/2009 |
| CN | 101458416 A | 6/2009 |
| CN | 101794036 A | 8/2010 |
| CN | 105093582 A | 11/2015 |
| CN | 105093622 A | 11/2015 |
| JP | 2004-54961 A | 2/2004 |
| JP | 2013-127366 A | 6/2013 |
| JP | 2015-55896 A | 3/2015 |
| KR | 10-2010-0031242 | 3/2010 |
| KR | 10-2011-0133651 A | 12/2011 |
| KR | 10-2012-0017755 | 2/2012 |
| KR | 10-2013-0004658 | 1/2013 |
| KR | 10-2015-00666885 A | 6/2015 |
| RU | 2 507 551 C2 | 2/2014 |
| TW | 201133430 A1 | 10/2011 |

OTHER PUBLICATIONS

Office Action dated Aug. 24, 2017 in Japanese Patent Application No. 2017-533683.
Office Action dated Jul. 11, 2017 in Korean Patent Application No. 10-2016-7004890.
International Search Report dated May 18, 2016 in WIPO Patent Application No. PCT/CN2015/098975.
Combined Russian Office Action and Search Report dated Apr. 10, 2017 in Russian Patent Application No. 2016106974/28 (with partial English language translation and English Translation of Categories of Cited Documents).
Korean Office Action dated Feb. 17, 2017 in Patent Application No. 10-2016-7004890 (with English translation).
Extended European Search Report dated Aug. 9, 2016 in Patent Application No. 16156386.1.

* cited by examiner

LIQUID CRYSTAL DISPLAY PANEL AND MOBILE TERMINAL

CROSS-REFERENCE TO RELATED APPLICATIONS

This application claims priority of Chinese Patent Application No. 201510493676.3 filed on Aug. 12, 2015, which is incorporated herein by reference in its entirety.

FIELD

The present disclosure generally relates to a technical field of display, and more particularly to a liquid crystal display panel and a mobile terminal.

BACKGROUND

With development in liquid crystal display technology, a liquid crystal display panel is capable of not only functioning as a display device but also performing other functions including sensing positions of touch inputs. In some applications, a touch sensing panel is added to a liquid crystal display panel such that coordinates of a position of a touch input can be determined based on detecting the variations in capacitance in the touch sensing panel. However, in many applications using the touch sensing panel, only two-dimensional coordinates of the touch input on the liquid crystal display screen is determined, without the information regarding a pressure value of the touch input.

SUMMARY

Aspects of the disclosure provide a liquid crystal display panel. The liquid crystal display panel includes a glass substrate, a color filter, and a liquid crystal layer between the glass substrate and the color filter. The liquid crystal layer includes an array of supporting members at a first side of the liquid crystal layer, one or more transparent electrodes at a second side of the liquid crystal layer, and liquid crystals between the array of supporting members and the one or more transparent electrodes. The first side of the liquid crystal layer is adjacent to one of the glass substrate and the color filter. The second side of the liquid crystal layer is adjacent to the other one of the glass substrate and the color filter.

In an embodiment, the one or more transparent electrodes include a plurality of transparent electrodes arranged in parallel. In an embodiment, the plurality of transparent electrodes is arranged in parallel with a horizontal direction with respect to pixels of the liquid crystal display panel. In another embodiment, the plurality of transparent electrodes is arranged in parallel with a vertical direction with respect to the pixels of the liquid crystal display panel.

In an embodiment, the liquid crystal display panel further includes a controller electrically coupled with the one or more transparent electrodes and configured to determine a capacitance value between the array of supporting members and at least one of the one or more transparent electrodes.

In an embodiment, the liquid crystal display panel further includes a backlight assembly, and the glass substrate is between the backlight assembly and the liquid crystal layer.

In an embodiment, the color filter includes a plurality of sub-pixel areas and a black matrix separating individual sub-pixel areas of the plurality of sub-pixel areas. In an embodiment, each supporting member of the array of supporting members overlaps a respective portion of the black matrix of the color filter in a normal direction that is perpendicular to a horizontal direction with respect to pixels of the liquid crystal display panel and perpendicular a vertical direction with respect to the pixels of the liquid crystal display panel.

Aspects of the disclosure provide a mobile terminal. The mobile terminal includes a processor and a liquid crystal display panel electrically coupled with the processor. The liquid crystal display panel includes a glass substrate, a color filter, and a liquid crystal layer between the glass substrate and the color filter. The liquid crystal layer includes an array of supporting members at a first side of the liquid crystal layer, one or more transparent electrodes at a second side of the liquid crystal layer, and liquid crystals between the array of supporting members and the one or more transparent electrodes. The first side of the liquid crystal layer is adjacent to one of the glass substrate and the color filter. The second side of the liquid crystal layer is adjacent to the other one of the glass substrate and the color filter. The processor is configured to obtain a capacitance value between the array of supporting members and at least one of the one or more transparent electrodes, and determine a pressure value of a user operation applied on the liquid crystal display panel based on the detected capacitance value.

Aspects of the disclosure provide a method of determining a pressure value of a user operation applied on a liquid crystal display panel. The method includes detecting one or more voltage levels on one or more corresponding transparent electrodes; determining one or more capacitance values between the one or more corresponding transparent electrodes and an array of supporting members based on the one or more voltage levels; and determining the pressure value based on the one or more capacitance values. The one or more transparent electrodes are at a first side of a liquid crystal layer of the liquid crystal display panel. The array of supporting members is at a second side of the liquid crystal layer of the liquid crystal display panel.

In an embodiment, the method further includes determining a position on the liquid crystal display panel upon which the user operation is applied based on the one or more capacitance values.

It should be understood that various examples described in both the forgoing general description and the following detailed description are only for illustrative purposes, and are not in any way restrictive of the present disclosure.

BRIEF DESCRIPTION OF THE DRAWINGS

The accompanying drawings, which are incorporated in and constitute a part of this disclosure, illustrate embodiments in accordance with the present disclosure and, together with the detailed description, serve to explain the principles of various features of the present disclosure.

DETAILED DESCRIPTION

Reference will now be made in detail to various embodiments, examples of which are illustrated in the accompanying drawings. The following description refers to the accompanying drawings in which same numbers in different drawings represent same or similar elements unless otherwise described. The implementations set forth in the following description of various embodiments do not represent all implementations consistent with various features disclosed in the present disclosure. Instead, they are merely examples of apparatuses and methods consistent with various features disclosed in the present disclosure.

Figure 1:
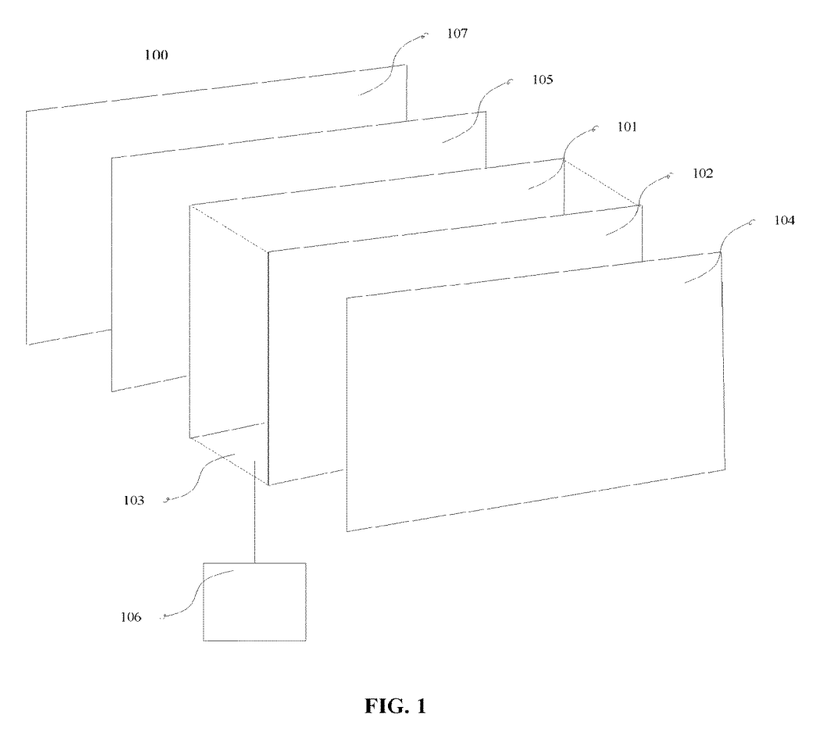
FIG. 1 is an exploded view showing a liquid crystal display panel according to an embodiment of the disclosure.

FIG. 1 is an exploded view showing a liquid crystal display panel according to an embodiment of the disclosure. The liquid crystal display panel 100 includes a glass substrate 101, a color filter 102, a liquid crystal layer 103 between the glass substrate 101 and the color filter 102, an upper polarizer plate 104, and a lower polarizer 105. The upper polarizer plate 104 is on a surface, which is not adjacent to the liquid crystal layer 103, of the color filter 102. The lower polarizer plate 105 is on a surface, which is not adjacent to the liquid crystal layer 103, of the glass substrate 101. The glass substrate 101 may be a TFT (Thin Film Transistor) array glass substrate.

The liquid crystal layer 103 includes an array of supporting members 1031 and one or more transparent electrodes 1032. The array of supporting members 1031 and the one or more transparent electrodes 1032 are at opposite sides of the liquid crystal layer 103. Liquid crystals are filled between the array of supporting members 1031 and the one or more transparent electrodes 1032.

In some embodiments, the array of supporting members 1031 is at the side of the liquid crystal layer 103 adjacent to the glass substrate 101, and the one or more transparent electrodes 1032 is at the side of the liquid crystal layer 103 adjacent to the color filter 102. In some embodiments, the array of supporting members 1031 is at the side of the liquid crystal layer 103 adjacent to the color filter 102, and the one or more transparent electrodes 1032 is at the side of the liquid crystal layer 103 adjacent to the glass substrate 101.

Figure 2:
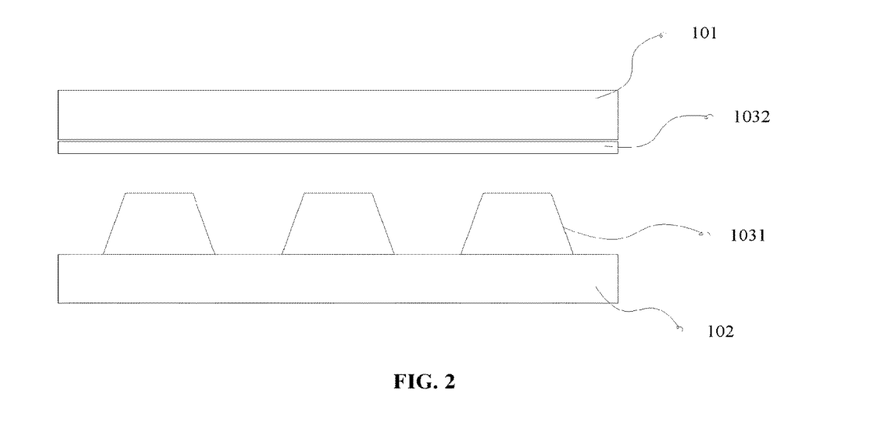
FIG. 2 is a cross-sectional view showing a liquid crystal layer in the liquid crystal display panel according to an embodiment of the disclosure.

As shown in FIG. 2, which is a cross-sectional view of the liquid crystal layer 103, the array of supporting members 1031 and the one or more transparent electrodes 1032 can be positioned as follows: the array of supporting members 1031 is positioned on a side, which is adjacent to the glass substrate 101, of the liquid crystal layer 103; and the one or more transparent electrodes 1032 are positioned on another side, which is adjacent to the color filter 102, of the liquid crystal layer 103.

Figure 3:
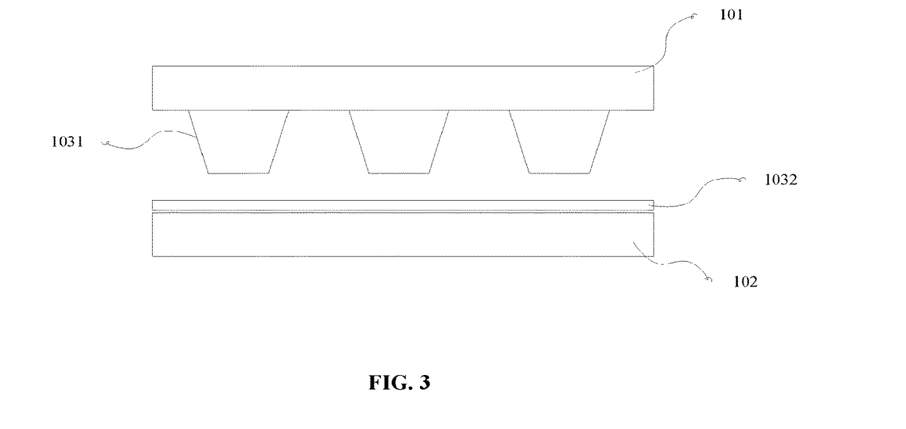
FIG. 3 is a cross-sectional view showing a liquid crystal layer in the liquid crystal display panel according to another embodiment of the disclosure.

Furthermore, as shown in FIG. 3, which is a cross-sectional view of the liquid crystal layer 103, the array of supporting members 1031 and the one or more transparent electrodes 1032 can also be positioned as follows: the array of supporting members 1031 is positioned on a surface, which is adjacent to the color filter 102, of the liquid crystal layer 103; and the one or more transparent electrodes 1032 are positioned on another side, which is adjacent to the glass substrate 101, of the liquid crystal layer 103.

In some embodiments of the present disclosure, the one or more transparent electrodes 1032 can be a sheet of transparent electrode, or can be a plurality of transparent electrodes.

According to a first type of configuration of various embodiments, the one or more transparent electrodes 1032 include a single sheet of transparent electrode.

The array of supporting members 1031 is not in direct contact with the transparent electrode 1032 in the liquid crystal layer 103. The array of supporting members 1031 and the transparent electrode 1032 are separated by a predetermined distance when there is no touch input applied on the liquid crystal display panel 100. The array of supporting members 1031 and the transparent electrode 1032 constitute a capacitor. As the distance between the array of supporting members 1031 and the transparent electrode 1032 remains the same (with negligible engineering tolerance) when the liquid crystal display panel 100 is not pressed, a capacitance value of the capacitor constituted by the array of supporting members 1031 and the transparent electrode 1032 remains substantially unchanged. The reference capacitance value of the capacitor constituted by the array of supporting members 1031 and the transparent electrode 1032 when the liquid crystal display panel 100 is not pressed can be detected in advance, and the capacitance value can be taken as a reference for determining whether the liquid crystal display screen 100 is pressed.

The capacitance value of the capacitor constituted by the array of supporting members 1031 and the transparent electrode 1032 can be detected by the following way: the transparent electrode 1032 is electrically coupled with a controller, such as a control chip. The controller issues a detecting instruction to the transparent electrode 1032 and a voltage level of the transparent electrode 1032 is detected. The capacitance value of the capacitor currently constituted by the array of supporting members 1031 and the transparent electrode 1032 is calculated by using a predetermined equation based on the detected voltage level.

The controller can be a device in the liquid crystal display panel 100. Accordingly, the liquid crystal display panel 100 further includes the controller 106, and the transparent electrode 1032 is electrically coupled with the controller 106. The controller can be a Micro Controller Unit (MCU). The MCU further includes an analog-to-digital (A/D) converter that can convert a voltage signal on the transparent electrode 1032 from an analog signal to a digital signal and then calculate the capacitance value.

In another embodiment, the controller can be a device of a mobile terminal outside the liquid crystal display panel 100.

According to a second type of configuration of various embodiments, the one or more transparent electrodes 1032 include a plurality of transparent electrodes.

The transparent electrodes 1032 can be arranged in one of the following manners: the transparent electrodes 1032 are arranged in parallel in a horizontal direction with respect to the pixels of the liquid crystal display panel 100; the transparent electrodes 1032 are arranged in parallel in a vertical direction with respect to the pixels of the liquid crystal display panel 100; and the transparent electrodes 1032 include a first plurality of transparent electrodes arranged in parallel in the horizontal direction and a second plurality of transparent electrodes arranged in parallel in the vertical direction. In some embodiments, every two adjacent transparent electrodes that are arranged in parallel are separated by a same predetermined distance.

In the liquid crystal layer 103, the array of supporting members 1031 is not in direct contact with each transparent electrode of the transparent electrodes 1032. The array of supporting members 1031 and each transparent electrode of the transparent electrodes 1032 are separated by a predetermined distance when there is no touch input applied on the liquid crystal display panel 100. The array of supporting members 1031 and each transparent electrode of the transparent electrodes 1032 constitute a respective capacitor, and the number of capacitors is the same as the number of the transparent electrodes 1032.

As the distance between the array of supporting members 1031 and each transparent electrode of the transparent electrodes 1032 remains the same (with negligible engineering tolerance) when the liquid crystal display panel 100 is not pressed, the capacitance value of each capacitor constituted by the array of supporting members 1031 and each transparent electrode of the transparent electrodes 1032 remains substantially unchanged. Therefore, the capacitance value of the capacitor constituted by the array of supporting members 1031 and each transparent electrode of the transparent electrodes 1032 when the liquid crystal display panel 100 is not pressed can be detected in advance, and the capacitance value of each transparent electrode can be taken as a reference for determining whether the liquid crystal display panel 100 is pressed.

In some applications, the distances between the array of supporting members 1031 and every transparent electrode of the transparent electrodes 1032 are substantially the same (with negligible engineering tolerance), so the capacitance values of the capacitors constituted by the array of supporting members 1031 and every transparent electrode of the transparent electrodes 1032 when the liquid crystal display panel 100 is not pressed are the same. Accordingly, the capacitance value of any transparent electrode can be calculated as the representative capacitance value for all the capacitors corresponding to the transparent electrodes 1032 when the liquid crystal display panel 100 is not pressed.

In some embodiments according to the second type of configuration of various embodiments, every transparent electrode of the transparent electrodes 1032 is electrically coupled with a controller, such as a control chip. The controller issues detecting instructions to every transparent electrode, and a current voltage level on every transparent electrode is detected accordingly. Capacitance values of the capacitors constituted by the array of supporting members 1031 and every transparent electrode of the transparent electrodes 1032 are calculated by using a predetermined equation based on the detected voltage levels.

In at least one embodiment, the controller can issue the detecting instructions to the transparent electrodes 1032 by at least one of the following way: issuing the detecting instructions to the transparent electrodes one at a time every first time period; and issuing the detecting instructions to all transparent electrode at the same time every second period. If the detecting instructions are issued at the same time, in some embodiments, the controller may include a plurality of A/D converters to process data returned from the transparent electrodes 1032.

In at least one embodiment, the controller issues the detecting instructions to the transparent electrodes 1032 when the liquid crystal display panel 100 is in a blanking interval, so that interference caused by the scanning of the liquid crystal display panel 100 can be avoided.

Figure 4:
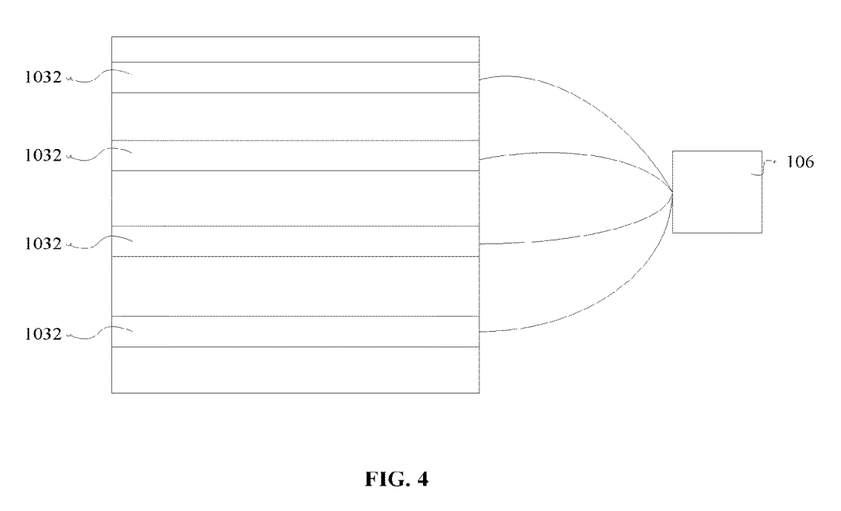
FIG. 4 is a structure diagram showing the liquid crystal display panel in which a plurality of transparent electrodes is arranged in parallel in a horizontal direction according to an embodiment of the disclosure.

FIG. 4 is a structure diagram showing the liquid crystal display panel in which the one or more transparent electrodes 1032 include a plurality of transparent electrodes arranged in parallel in the horizontal direction with respect to the pixels of the liquid crystal display panel.

Figure 5:
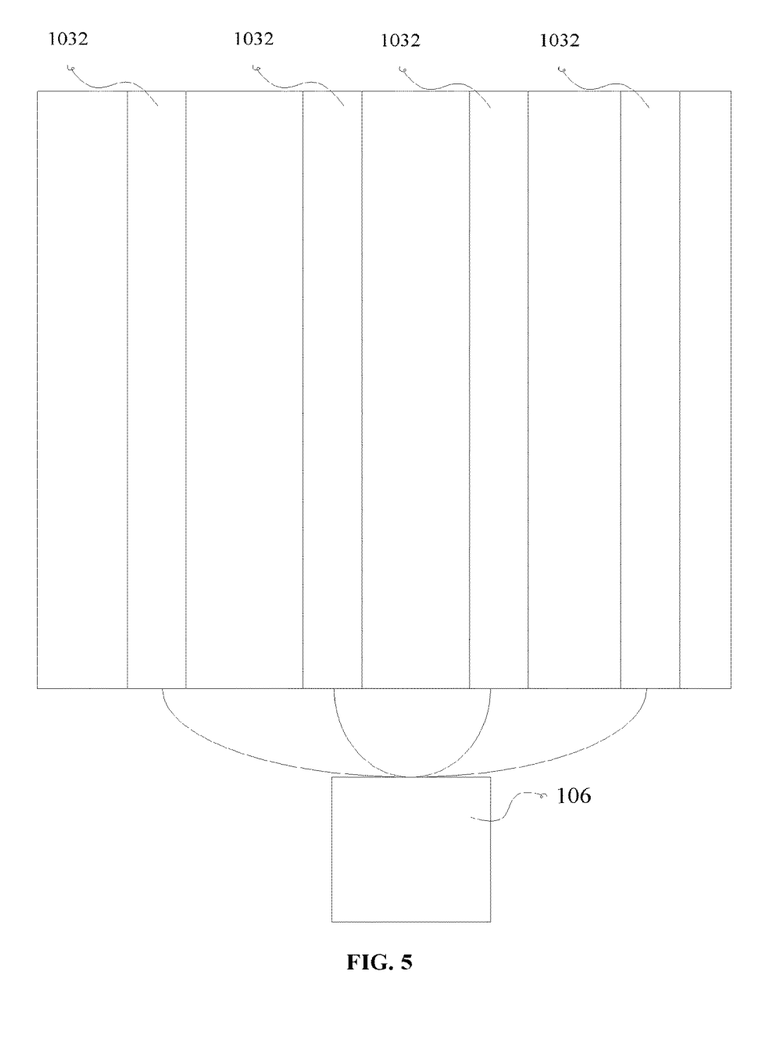
FIG. 5 is a structure diagram showing the liquid crystal display panel in which a plurality of transparent electrodes is arranged in parallel in a vertical direction according to another embodiment of the disclosure.

FIG. 5 is a structure diagram showing the liquid crystal display panel in which the one or more transparent electrodes 1032 include a plurality of transparent electrodes arranged in parallel in the vertical direction with respect to the pixels of the liquid crystal display panel.

Figure 6:
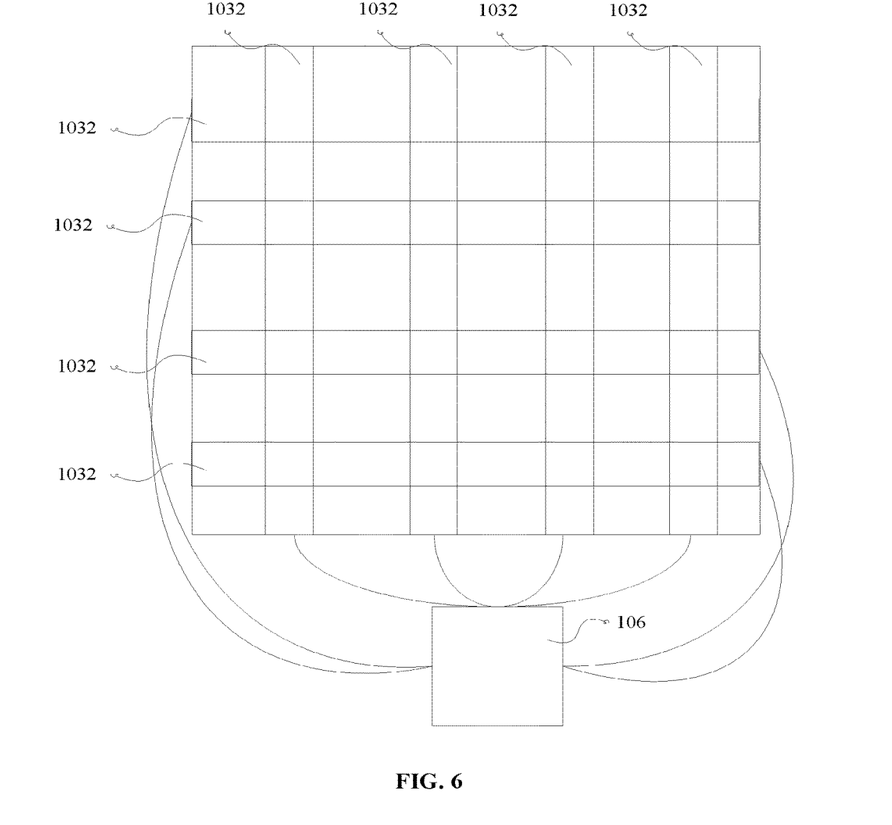
FIG. 6 is a structure diagram showing the liquid crystal display panel in which a first plurality of transparent electrodes is arranged in parallel in a horizontal direction and a second plurality of transparent electrodes is arranged in parallel in a vertical direction according to another embodiment of the disclosure.

FIG. 6 is a structure diagram showing the liquid crystal display panel in which the one or more transparent electrodes 1032 include a first plurality of transparent electrodes arranged in parallel in the horizontal direction and a second plurality of transparent electrodes arranged in parallel in the vertical direction.

In some embodiments, the color filter 102 includes a plurality of sub-pixel areas and a black matrix (BM) and/or gap regions separating individual sub-pixel areas of the plurality of sub-pixel areas. In some examples, each supporting member of the array of supporting members 1032 is positioned under the black matrix and/or the gap regions such that each supporting member overlaps a respective portion of the black matrix and/or a respective portion of the gap regions of the color filter 102 in a normal direction that is perpendicular to the horizontal direction and perpendicular the vertical direction of the liquid crystal display panel 100. In some examples, each one of the one or more transparent electrodes 1032 overlaps a respective supporting member of the array of supporting members 1031 in the normal direction.

In some examples, when the one or more transparent electrodes 1032 include a first plurality of transparent electrodes arranged in parallel in the horizontal direction (i.e., rows of transparent electrodes) and a second plurality of transparent electrodes arranged in parallel in the vertical direction (i.e., columns of transparent electrodes), row identifiers or column identifiers corresponding to every row and column of transparent electrodes can be set in advance. Positions of every transparent electrode in the liquid crystal display panel 100 can be determined in advance based on the row identifiers or the column identifiers.

The controller can further determine the row identifiers or the column identifiers corresponding to every transparent electrode when acquiring voltage levels on every transparent electrode. Furthermore, if the detected capacitance value of the transparent electrode is different from the detected capacitance value when the liquid crystal display panel 100 is not pressed, the pressed position on the liquid crystal display panel 100 can be determined based on the row identifier or the column identifier of the transparent electrode.

In some embodiments of the present disclosure, after the capacitance value is detected by using the one or more transparent electrodes 1032, a pressure value of a user operation applied on the liquid crystal display panel 100 can be determined based on predetermined relationships between the capacitance values and corresponding pressure values.

In some embodiments of the present disclosure, after a plurality of capacitance values is detected by using the plurality of transparent electrodes 1032, one of the plurality of capacitance values can be selected (e.g., the largest capacitance value is selected), and the pressure value of the user operation applied on the liquid crystal display panel 100 can be determined using the selected capacitance value based on the predetermined relationships between the capacitance values and the pressure values. In an alternative embodiment, as the transparent electrodes 1032 in the liquid crystal display panel 100 are not evenly pressed by the user, a plurality of regions on the liquid crystal display panel 100 are determined to be pressed by the user, one or more capacitance values can be selected from the regions so as to calculate the pressure values in the respective regions, and a plurality of pressure values corresponding to the respective regions can be determined.

In some embodiments of the present disclosure, as shown in FIG. 1, the liquid crystal display panel 100 further includes a backlight assembly 107. The backlight assembly 107 is positioned on a surface, which is not adjacent to the glass substrate 101, of the lower polarizer plate 105. Thus, the lower polarizer 105 is between the backlight assembly 107 and the glass substrate 101.

In at least one embodiment, if the liquid crystal display panel 100 is a Liquid Crystal Display (LCD) panel, the liquid crystal display panel 100 includes the backlight assembly 107. In at least another embodiment, if the liquid crystal display panel 100 is an Organic Light-Emitting Diode (OLED) panel, the liquid crystal display panel 100 does not include the backlight assembly 107.

According to various embodiments of the present disclosure, by using the transparent electrode and the array of supporting members provided in the liquid crystal layer in the liquid crystal display panel, pressure values of user operations applied on the liquid crystal display panel can be determined based on capacitance values formed between the transparent electrode and the array of supporting members, so pressure sensing as a third dimensional information, in addition to the two-dimensional coordinates from the touch sensing, of a user operation is implemented on the liquid crystal display panel. More functions can be implemented by using the detected pressure values, and human-computer interaction can be improved.

Figure 7:
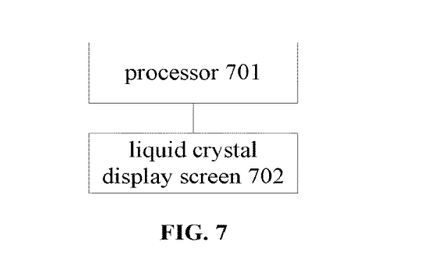
FIG. 7 is a block diagram showing a mobile terminal according to an embodiment of the disclosure.

FIG. 7 is a block diagram showing a mobile terminal according to an embodiment of the disclosure. As shown in FIG. 7, the mobile terminal includes a processor 701 and a liquid crystal display panel 702. The liquid crystal display panel 702 includes a glass substrate, a color filter, a liquid crystal layer between the glass substrate and the color filter, an upper polarizer, and a lower polarizer. The upper polarizer plate is on a surface, which is not adjacent to the liquid crystal layer, of the color filter. The lower polarizer is on a surface, which is not adjacent to the liquid crystal layer, of the glass substrate. The glass substrate may be a TFT (Thin Film Transistor) array glass substrate. The liquid crystal layer further includes an array of supporting members and one or more transparent electrodes. The array of supporting members and the one or more transparent electrodes are at opposite sides of the liquid crystal layer. Liquid crystals are filled between the array of supporting members and the one or more transparent electrodes. The processor 701 is configured to detect a capacitance value between the array of supporting members and the one or more transparent electrodes, and determine a pressure value of a user operation applied on the liquid crystal display panel based on the detected capacitance value.

In some embodiments of the present disclosure, by using the transparent electrode and the array of supporting members provided in the liquid crystal layer in the liquid crystal display panel, a pressure value of a user operation applied on the liquid crystal display panel can be determined based on a capacitance value formed between the transparent electrode and the array of supporting members, so pressure sensing as a third dimensional information, in addition to the two-dimensional coordinates from the touch sensing, of a user operation is implemented on the liquid crystal display panel. More functions can be implemented by using the detected pressure value, and human-computer interaction can be improved.

Other embodiments will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and embodiments be considered as only for illustrative purposes.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A liquid crystal display panel, comprising:
   a glass substrate;
   a color filter; and
   a liquid crystal layer between the glass substrate and the color filter, wherein
   the liquid crystal layer comprises:
      an array of supporting members at a first side of the liquid crystal layer, the first side of the liquid crystal layer being adjacent to the color filter;
      one or more transparent electrodes at a second side of the liquid crystal layer, the second side of the liquid crystal layer being adjacent to the glass substrate; and
      liquid crystals between the array of supporting members and the one or more transparent electrodes,
   wherein
   the color filter comprises:
      a plurality of sub-pixel areas; and
      a black matrix separating individual sub-pixel areas of the plurality of sub-pixel areas,
      each supporting member of the array of supporting members is positioned under the black matrix such that each supporting member of the array of supporting members overlaps a respective portion of the black matrix of the color filter in a normal direction that is perpendicular to a horizontal direction with respect to pixels of the liquid crystal display panel and perpendicular to a vertical direction with respect to the pixels of the liquid crystal display panel, and
      each one of the one or more transparent electrodes overlaps a respective supporting member of the array of supporting members in the normal direction.

2. The liquid crystal display panel of claim 1, wherein the liquid crystal display panel further comprises:
   a first polarizer, the color filter being between the first polarizer and the liquid crystal layer; and
   a second polarizer, the glass substrate being between the second polarizer and the liquid crystal layer.

3. The liquid crystal display panel of claim 1, wherein
   the plurality of transparent electrodes is arranged in parallel with the horizontal direction with respect to pixels of the liquid crystal display panel; and
   every two adjacent transparent electrodes of the plurality of transparent electrodes are separated by a predetermined distance.

4. The liquid crystal display panel of claim 1, wherein
the plurality of transparent electrodes is arranged in parallel with the vertical direction with respect to pixels of the liquid crystal display panel; and
every two adjacent transparent electrodes of the plurality of transparent electrodes are separated by a predetermined distance.

5. The liquid crystal display panel of claim 1, further comprising:
a controller electrically coupled with the one or more transparent electrodes and configured to determine a capacitance value between the array of supporting members and at least one of the one or more transparent electrodes.

6. The liquid crystal display panel of claim 5, wherein the controller comprises an analog-to-digital converter configured to convert an analog signal from the at least one of the one or more transparent electrodes to a digital signal.

7. The liquid crystal display panel of claim 1, further comprising:
a backlight assembly, the glass substrate being between the backlight assembly and the liquid crystal layer.

8. A mobile terminal, comprising:
a processor; and
a liquid crystal display panel electrically coupled with the processor,
wherein
the liquid crystal display panel comprises:
a glass substrate;
a color filter; and
a liquid crystal layer between the glass substrate and the color filter,
the liquid crystal layer further comprises:
an array of supporting members at a first side of the liquid crystal layer, the first side of the liquid crystal layer being adjacent to the color filter;
one or more transparent electrodes at a second side of the liquid crystal layer, the second side of the liquid crystal layer being adjacent to the glass substrate; and
liquid crystals between the array of supporting members and the one or more transparent electrodes,
the processor is configured to:
obtain a capacitance value between the array of supporting members and at least one of the one or more transparent electrodes, and
determine a pressure value of a user operation applied on the liquid crystal display panel based on the detected capacitance value,
the color filter comprises:
a plurality of sub-pixel areas; and
a black matrix separating individual sub-pixel areas of the plurality of sub-pixel areas,
each supporting member of the array of supporting members overlaps a respective portion of the black matrix of the color filter in a normal direction that is perpendicular to a horizontal direction with respect to pixels of the liquid crystal display panel and perpendicular to a vertical direction with respect to the pixels of the liquid crystal display panel, and
each one of the one or more transparent electrodes overlaps a respective supporting member of the array of supporting members in the normal direction.

9. The mobile terminal of claim 8, wherein the liquid crystal display panel further comprises:
a first polarizer, the color filter being between the first polarizer and the liquid crystal layer; and
a second polarizer, the glass substrate being between the second polarizer and the liquid crystal layer.

10. The mobile terminal of claim 8, wherein
the plurality of transparent electrodes is arranged in parallel with the horizontal direction with respect to pixels of the liquid crystal display panel; and
every two adjacent transparent electrodes of the plurality of transparent electrodes are separated by a predetermined distance.

11. The mobile terminal of claim 8, wherein
the plurality of transparent electrodes is arranged in parallel with the vertical direction with respect to pixels of the liquid crystal display panel; and
every two adjacent transparent electrodes of the plurality of transparent electrodes are separated by a predetermined distance.

12. The mobile terminal of claim 8, further comprising:
a controller electrically coupled with the one or more transparent electrodes and configured to determine the capacitance value between the array of supporting members and the at least one of the one or more transparent electrodes.

13. A method of determining a pressure value of a user operation applied on a liquid crystal display panel that includes:
a glass substrate;
a color filter; and
a liquid crystal layer between the glass substrate and the color filter, the liquid crystal layer including:
an array of supporting members at a first side of the liquid crystal layer, the first side of the liquid crystal layer being adjacent to the color filter;
one or more transparent electrodes at a second side of the liquid crystal layer, the second side of the liquid crystal layer being adjacent to the glass substrate; and
liquid crystals between the array of supporting members and the one or more transparent electrodes,
wherein
the color filter comprises:
a plurality of sub-pixel areas; and
a black matrix separating individual sub-pixel areas of the plurality of sub-pixel areas,
each supporting member of the array of supporting members overlaps a respective portion of the black matrix of the color filter in a normal direction that is perpendicular to a horizontal direction with respect to pixels of the liquid crystal display panel and perpendicular to a vertical direction with respect to the pixels of the liquid crystal display panel,
each one of the one or more transparent electrodes overlaps a respective supporting member of the array of supporting members in the normal direction, and
the method comprises:
detecting one or more voltage levels on one or more corresponding transparent electrodes;
determining one or more capacitance values between the one or more transparent electrodes and the array of supporting members based on the one or more voltage levels; and
determining the pressure value based on the one or more capacitance values.

14. The method according to claim 13, further comprising:

determining a position on the liquid crystal display panel upon which the user operation is applied based on the one or more capacitance values.

* * * * *